United States Patent
Dodd

[11] Patent Number: 5,609,470
[45] Date of Patent: Mar. 11, 1997

[54] TURBOMACHINE AEROFOIL WITH CONCAVE SURFACE IRREGULARITIES

[75] Inventor: Alec G. Dodd, Derby, England

[73] Assignee: Rolls-Ryce plc, London, England

[21] Appl. No.: 495,174

[22] Filed: Jun. 27, 1995

[30] Foreign Application Priority Data

Sep. 30, 1994 [GB] United Kingdom ............ 9419712

[51] Int. Cl.$^6$ ........................................ F01D 5/14
[52] U.S. Cl. ............... 416/192; 416/235; 416/236 R; 415/914.
[58] Field of Search .............................. 416/191, 192, 416/235, 236 R, 236 A; 415/914

[56] References Cited

U.S. PATENT DOCUMENTS

| 1,903,823 | 4/1933 | Lougheed .................. 415/914 |
| 4,302,256 | 11/1981 | Kenton . | |
| 5,169,290 | 12/1992 | Chou ..................... 416/236 R |
| 5,209,644 | 5/1993 | Dorman .................... 415/914 |
| 5,299,353 | 4/1994 | Nazmy et al. . | |

FOREIGN PATENT DOCUMENTS

| 580806 | 9/1946 | United Kingdom . |
| 1586331 | 3/1981 | United Kingdom . |

Primary Examiner—James Larson
Attorney, Agent, or Firm—Cushman Darby & Cushman IP Group of Pillsbury Madision & Sutro LLP

[57] ABSTRACT

A cast and hot isostatically pressed gamma titanium aluminide turbine blade has an aerofoil portion including a concave pressure surface and a convex suction surface. The concave pressure surface has surface irregularities, produced by the action of the hot isostatic pressing process on voids located within the cast turbine blade, located in that region of the concave pressure surface where in operation aerodynamic separation occurs to minimise the aerodynamic effects of the surface irregularities upon the operation of the turbine blade. The remaining portion of the concave pressure surface and the whole of the convex suction surface are substantially free of surface irregularities.

7 Claims, 3 Drawing Sheets

TURBOMACHINE AEROFOIL WITH CONCAVE SURFACE IRREGULARITIES

BACKGROUND OF THE INVENTION

The present invention relates to turbomachine aerofoils, and is particularly concerned with turbomachine aerofoils which have been produced by casting and hot isostatic pressing processes.

It is well known in the art to produce turbomachine aerofoils, whether a turbomachine blade or a turbomachine vane, by casting molten metal into a mould and allowing the molten metal to cool in the mould and to take the shape defined by the mould. One of the problems associated with the casting process is that there is a possibility of voidage, or porosity, in the finished cast component. It is also well known in the art to remove this unwanted voidage, or porosity, by the use of a hot isostatic pressing process. This involves placing the finished cast component into an autoclave, i.e. a high pressure vessel, sealing the autoclave and applying high pressures and high temperatures on the cast components in the autoclave.

A problem with metals, or alloys, which exhibit a high degree of voidage, or porosity, for example gamma titanium aluminides is that surface irregularities, i.e., dimples, may result on the surface of the cast and hot isostatically pressed component. In the case of turbomachine aerofoils, the surface irregularities may have detrimental effects on the performance of the turbomachine aerofoils in operation.

One way to overcome the problem is to cast the component oversize and then to machine the cast and hot isostatically pressed turbomachine aerofoil to exact and shape. However, this machining operation is very expensive. Another way to overcome the problem is to cast the component to size and shape and to fill in the surface irregularities on the cast and hot isostatically pressed turbomachine aerofoil by for example weld deposition.

SUMMARY OF THE INVENTION

Accordingly the present invention seeks to provide a cast and hot isostatically pressed turbomachine aerofoil having surface irregularities in which the effects of the surface irregularities are reduced or minimised.

Accordingly the present invention provides a cast and hot isostatically pressed turbomachine aerofoil including a concave surface and a convex surface, the concave surface having surface irregularities produced by the action of the hot isostatic pressing process on voids in the cast turbomachine aerofoil located in that region of the concave surface where in operation aerodynamic separation, a slow flow or a stagnant flow occurs, the remainder of the concave pressure surface and the convex surface being substantially free of surface irregularities.

Preferably the turbomachine aerofoil includes a shroud located at one end of the aerofoil, the shroud has a recess in its surface facing away from the aerofoil.

Preferably the turbomachine aerofoil is a blade, or a vane, for a gas turbine engine.

The turbomachine aerofoil may be a turbine blade, a turbine vane, a compressor blade or a compressor vane.

The turbomachine aerofoil may be cast from a gamma titanium aluminide.

The curvatures of the convex surface and the concave surface are arranged to produce a thickness distribution of the aerofoil and a curvature of the concave surface which locates substantially all the surface irregularities in that region of the concave surface where in operation aerodynamic separation, a slow flow or a stagnant flow occurs.

The present invention also provides a method of producing a turbomachine aerofoil comprising:

(a) producing a mould for casting the turbomachine aerofoil, the mould having surfaces defining the convex surface and the concave surface of the turbomachine aerofoil, (b) pouring molten metal, or molten alloy, into the mould, (c) cooling the molten metal, or molten alloy, while within the mould to produce a cast turbomachine aerofoil, (d) placing the cast turbomachine aerofoil in an autoclave, (e) applying heat and applying pressure to the cast turbomachine aerofoil while within the autoclave to remove any voidage within the cast turbomachine aerofoil and to produce surface irregularities on the cast turbomachine aerofoil, wherein the producing of the mould includes arranging the mould surfaces to produce a thickness distribution of the turbomachine aerofoil and a curvature of the concave surface of the turbomachine aerofoil which locate any surface irregularities produced by the subsequent application o heat and pressure on the voidage within the cast turbomachine aerofoil only in that region of the concave surface of the turbomachine aerofoil where in operation aerodynamic separation, a slow flow or a stagnant flow occurs.

Preferably the turbomachine aerofoil has a shroud, arranging the mould to have a surface to define a recess in a surface of the shroud facing away from the aerofoil.

Preferably the cast turbomachine aerofoil is removed from the mould after step (c) and before step (d).

The alloy may be a gamma titanium aluminide.

Preferably the turbomachine aerofoil is etched or blasted to remove any reaction products formed between the metal, or alloy, and the mould.

BRIEF DESCRIPTION OF THE DRAWINGS

The present invention will be more fully described by way of example with reference to the accompanying drawings, in which.

DESCRIPTION OF THE PREFERRED EMBODIMENTS

Figure 1:
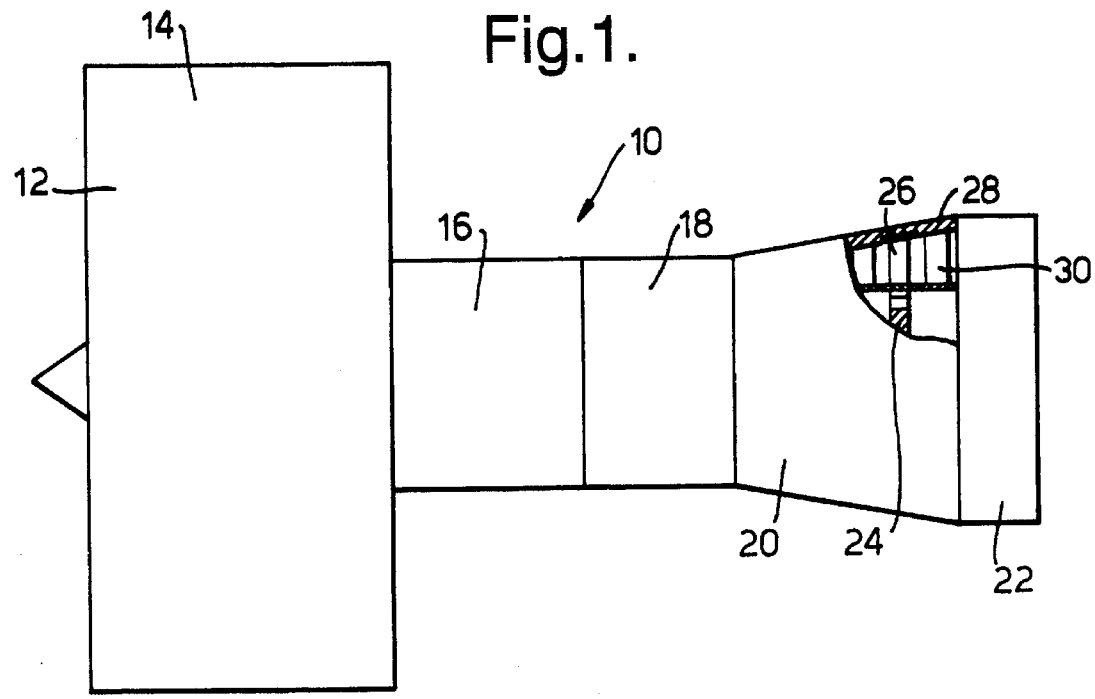
FIG. 1 is a partially cut away view of a gas turbine engine having a turbomachine aerofoil according to the present invention.

A gas turbine engine 10, shown in FIG. 1, comprises in flow series an intake 12, a fan section 14, a compressor section 16, a combustion section 18, a turbine section 20 and an exhaust 22. The turbine section 20 comprises a plurality of turbine rotors 24 arranged to drive the fan (not shown) of the fan section 14 and compressor rotors (not shown) of the compressor section 16 via shafts (not shown). Only one of the turbine rotors 24 of the turbine section 14 is shown. Each of the turbine rotors 24 carries a plurality of turbine blades 26. The turbine section also comprises a turbine stator casing 28 which supports a plurality of stages of turbine vanes 30. Each stage of turbine vanes comprises a plurality of turbine vanes 30.

Figure 2:
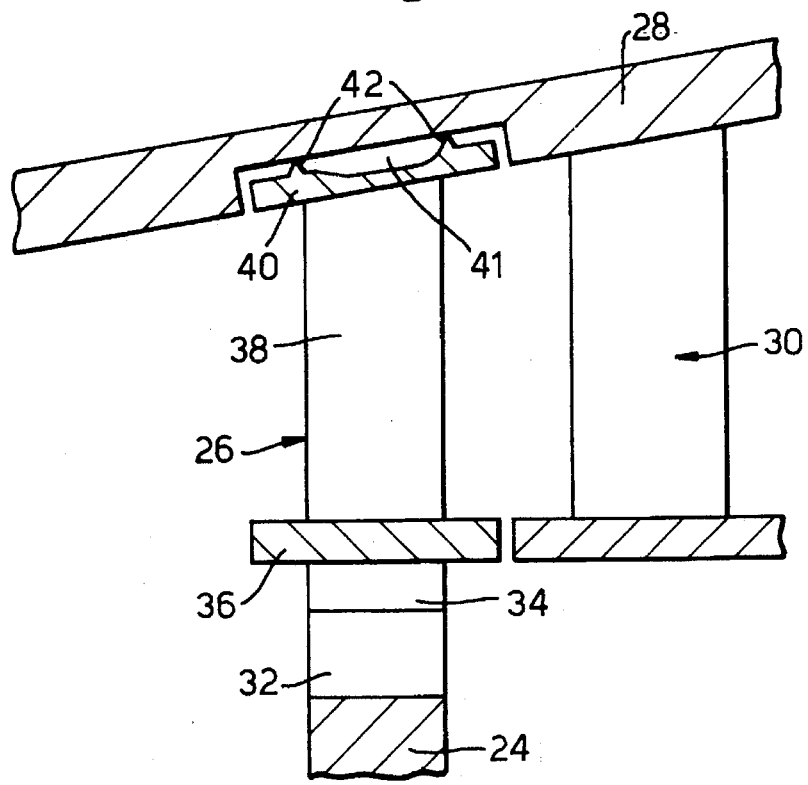
FIG. 2 is an enlarged longitudinal cross-sectional view through the gas turbine engine in FIG. 1 showing a turbomachine aerofoil.

A turbine rotor 24 and its associated turbine blades 26 are shown more clearly in FIG. 2. Each turbine blade 26 comprises a root portion 32, a shank portion 34, a platform portion 36, an aerofoil portion 38 and a shroud portion 40. The platform portion 36 and the shroud portion 40 partially define the inner and outer boundaries of the flow path of the hot gases through the turbine section 20. The shroud portion 40 also has sealing fins 42 which cooperate with the turbine casing 28 to prevent the leakage of hot gases around the shroud 40. The root portion 32 is shaped to locate in correspondingly shaped grooves on the rim of the turbine rotor 24 in order to retain the turbine blade 26 on the turbine rotor 24. The aerofoil portion 38 has a concave pressure surface 44 and a convex suction surface 46, as shown more clearly in FIGS. 6 and 7. The concave pressure surface 44 and the convex suction surface 46 extend from the leading edge 52 to the trailing edge 54 of the aerofoil portion 38.

There are new alloys suitable for use in the turbine blade 26 and turbine vanes 30 of the lower pressure and lower temperature stages of the turbine section 20. These new alloys, or intermetallics, are known as titanium aluminides, particularly gamma titanium aluminides for example $Ti_{48}$, $Al_{48}$, $Mn_2$, $Nb_2$ where the suffix denotes the atomic percent of the elements. A problem exists when these gamma titanium aluminide intermetallics are cast in moulds, because there is a relatively large amount of voidage, or porosity, in the cast turbine blade, or cast turbine vane, when compared to similar superalloy castings. The voidage is removed by hot isostatically pressing the gamma titanium aluminide intermetallic castings in an autoclave, however this results in surface irregularities, i.e. dimples, on the surface of the cast and hot isostatically pressed gamma titanium aluminide turbine blade, or turbine vane. These surface irregularities are normally removed by casting the turbine blades, or turbine vanes, oversize and then machining to size and shape, or by filling the surface irregularities by weld deposition.

Figure 7:
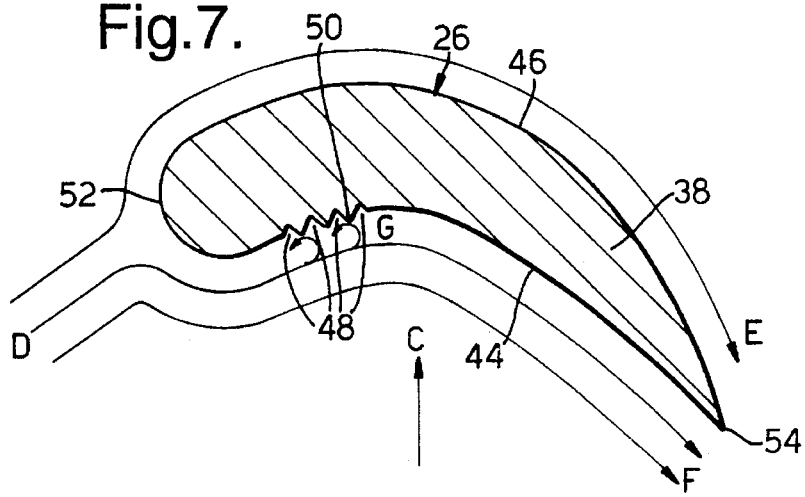
FIG. 7 is a cross-sectional view through a cast turbomachine aerofoil after hot isostatic pressing.

The present invention is based upon the concept of arranging for any surface irregularities 48, in the cast and hot isostatically pressed turbine blade 26, or turbine vane 30, to be solely in the region 50 of the concave pressure surface 44 where in operation aerodynamic separation occurs, i.e. where there is a reverse flow or a recirculating flow as is shown in FIG. 7, or where in operation there is a very slow flow or a stagnant flow next to the concave surface which is of similar or greater dimension to the depth of the surface irregularities and larger than the boundary layer on the concave surface. This will have the effect of minimising any aerodynamic effects that the surface irregularities 48 have on the gas flows around the turbine blade 26, or turbine vane 30. Thus it is not necessary to machine off or fill in the surface irregularities 48. The gas flow D splits at the leading edge 52 of the aerofoil portion 38 of the turbine blade 26 to flow E over the convex suction surface 46 and to flow F over the concave pressure surface 44. There is a separation region G on the concave pressure surface 44 but the main gas flow F is reaccelerated and reattaches to the concave pressure surface 44 with low aerodynamic loss.

In order to achieve this objective the curvatures of the convex suction surface 46 and the concave pressure surface 44 of the aerofoil portion 38 of the turbine blade 26, or turbine vane 30, are arranged to produce a thickness distribution of the aerofoil portion 38 and a curvature of the concave pressure surface 44 which locate the surface irregularities 48 only in that region 50 of the concave pressure surface 44 where in operation aerodynamic separation, a slow flow or a stagnant flow occurs. Any aerodynamic effects on the concave pressure surface 44 are dependent upon its curvature. Voidage, or porosity, effects are dependent upon the thickness distribution of the aerofoil portion 38. The thickness distribution of the aerofoil portion 38 depends upon the curvatures of the convex suction surface 46 and the concave pressure surface 44. Thus by adjusting the curvatures of the concave pressure surface 44 and the convex pressure surface 46 substantially all the voidage in the cast turbine blade will be in the region 50 where aerodynamic separation, a slow flow or a stagnant flow occurs.

Figure 3:
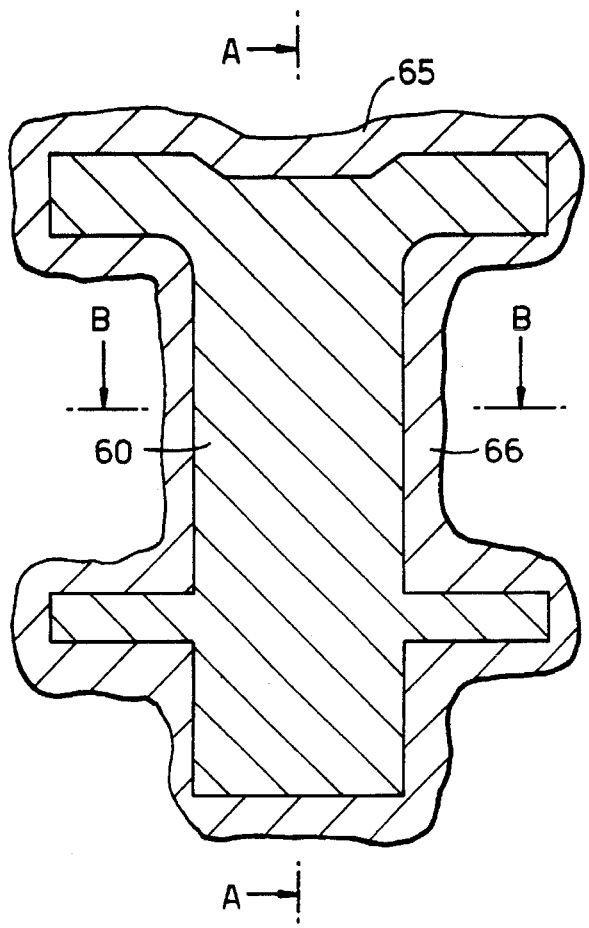
FIG. 3 is a longitudinal cross-sectional view through a mould for producing a turbomachine aerofoil according to the present invention.
Figure 4:
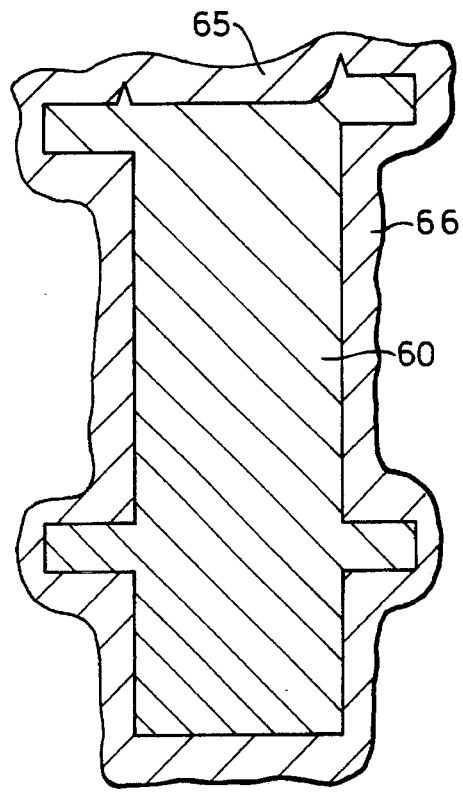
FIG. 4 is a cross-sectional view in the direction of arrows A—A in FIG. 3.
Figure 5:
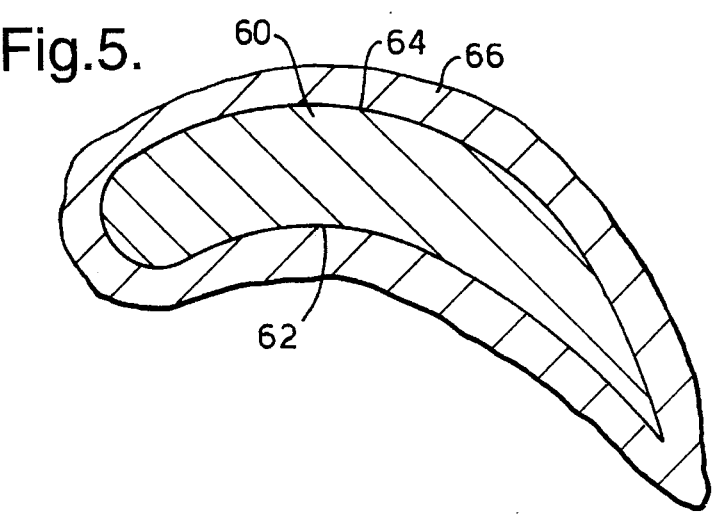
FIG. 5 is a cross-sectional view in the direction of arrows B—B in FIG. 3
Figure 6:
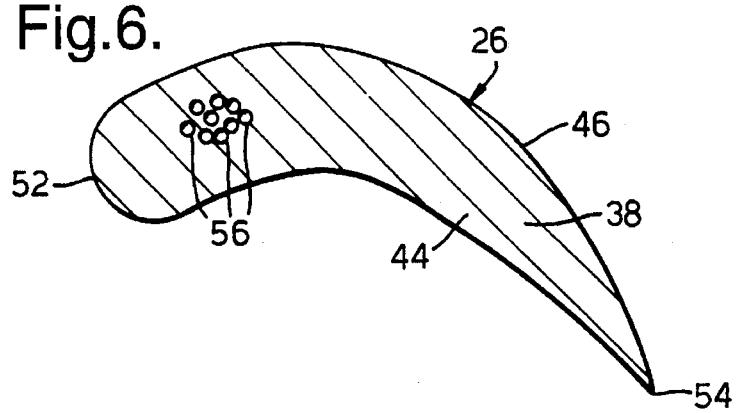
FIG. 6 is a cross-sectional view through a cast turbomachine aerofoil.

The method of producing a turbine blade, or turbine vane, is shown in FIGS. 3 to 8. Initially a wax pattern 60 is produced to define the predetermined size and shape of the turbine blade, or turbine vane. The wax pattern 60 has a concave surface 62 and a convex surface 64 corresponding to that required for the aerofoil portion 38 of the finished turbine blade 26, or turbine vane 30. A ceramic shell mould 66 is formed around the wax pattern 60 by immersing the wax pattern 60 in a liquid ceramic slurry which quickly gels after draining and by sprinkling strengthening refractory granules over the ceramic slurry covered wax pattern 60 to produce a ceramic layer on the wax,pattern 60. The process is repeated several times to produce a ceramic layer which has a total thickness of about ¼ inch (6mm) to ½ inch (12 mm) on the wax pattern 60 as shown in FIGS. 3 to 5. The wax is then melted out leaving a ceramic shell mould 66 having an internal cavity identical in shape to that of the wax pattern 60. The ceramic shell mould 66 is fired at a high temperature between 950° C. and 1100° C. to purify it by removing all traces of residual wax, while at the same time curing the ceramic shell mould 66. The ceramic shell mould 66 is then transferred to a casting furnace. A charge of molten gamma titanium aluminide is then poured into the ceramic shell mould 66 and the ceramic shell mould 66 is allowed to cool to room temperature, after which the ceramic shell mould 66 is removed leaving the cast turbine blade 26, or turbine vane 30, as shown in FIG. 6. The voidage, or porosity, 56 in the turbine blade 26 is only in the region 50, with respect to its chordal length, where aerodynamic separation, a slow flow or a stagnant flow will occur.

Figure 8:
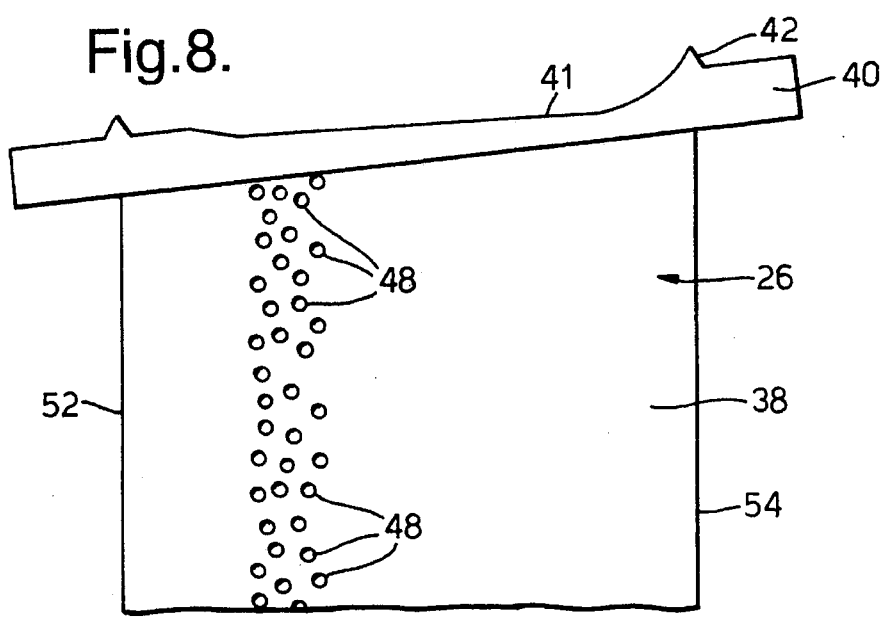
FIG. 8 is a view in the direction of arrow C in FIG. 6 of the concave pressure surface of a cast turbomachine aerofoil after hot isostatic pressing.

The cast turbine blade 26 is then placed in an autoclave, and the autoclave is sealed. The autoclave is evacuated and then inert gas, for example argon, is introduced into the autoclave. The pressure applied on the cast turbine blade 26 by the inert gas is increased and simultaneously the temperature in the autoclave is increased. The temperature is increased to between 1150° C. and 1320° C. and the pressure is increased to between 69 MPa and 310 MPa. These temperatures and pressures are then maintained substantially constant for several hours, for example 4 hours, and then the temperature and pressure are reduced to ambient. The consolidated turbine blade 26 as shown in FIGS. 7 and 8 has ad the voidage, or porosity, removed, but surface irregularities 48 appear in the region 50 of the concave pressure surface 44 where aerodynamic separation, slow flow or a stagnant flow occurs in operation, the remaining portion of the concave pressure surface 44 and the whole of the convex suction surface 46 are substantially free of surface irregularities.

In this example the turbine blade 26 has a shroud portion 40. The shroud portion has a recess 41 in its surface facing away from the aerofoil portion 38. The recess 41 is produced by defining a recess 65 in the corresponding surface of the shroud of the wax pattern 60. The effects of this recess 41 is to cause any voidage, or porosity, in the region of the aerofoil portion 38 nearest the shroud portion 40 of the cast turbine blade 26 to move towards the recess 41 and to increase the size of the recess 41 during the hot isostatic pressing process.

After the hot isostatic pressing step the surface of the aerofoil portion 38 is etched, or blasted, to remove any reaction products formed between the gamma titanium aluminide and the ceramic shell mould. The root portion 32 and the shank portion 34 are machined all over.

Although the invention has been described with reference to a gamma titanium aluminide comprising 48 atomic % titanium, 48 atomic % aluminium, 2 atomic % niobium and 2 atomic % manganese, it is possible to use other gamma titanium aluminides comprising 40 to 52 atomic % titanium, 44 to 52 atomic % aluminium and one or more of chromium, carbon, gallium, molybdenum, manganese, niobium, nickel, silicon, tantalum, vanadium and tungsten in an amount of between 0.05 to 8 atomic %. These gamma titanium aluminides may have a titanium diboride dispersoid in an amount between 0.5 to 20% volume. The invention is also applicable to any other metals, alloys or intermetallics which have relatively large amounts of voidage, or porosity, when cast, and which produce surface irregularities when consolidated by hot isostatic pressing. The invention is also suitable for use on gas turbine engine compressor blades or compressor vanes and also steam turbine blades. The invention is also applicable to turbomachine aerofoils which are unshrouded.

The invention enables the turbomachine aerofoil to be cast to exact size and shape without the need for weld filling of any surface irregularities, or dispenses with the need to cast oversize and to machine off excess metal, or alloy, including the surface irregularities to the exact size and shape required.

I claim:

1. A cast and hot isostatically pressed turbomachine aerofoil including a concave surface and a convex surface, the concave surface having surface irregularities produced by the action of a hot isostatic pressing process on voids in the cast turbomachine aerofoil located in that region of the concave surface where in operation aerodynamic separation, a reverse flow, a slow flow or a stagnant flow occurs, the remainder of the concave surface and the convex surface being substantially free of surface irregularities.

2. A turbomachine aerofoil as claimed in claim 1 in which the turbomachine aerofoil includes a shroud located at one end of the aerofoil, the shroud has a recess in its surface facing away from the aerofoil.

3. A turbomachine aerofoil as claimed in claim 1 or claim 2 in which the turbomachine aerofoil is a blade, or a vane, for a gas turbine engine.

4. A turbomachine aerofoil as claimed in claim 3 in which the turbomachine aerofoil is a turbine blade or a turbine vane.

5. A turbomachine aerofoil as claimed in claim 3 in which the turbomachine aerofoil is a compressor blade or a compressor vane.

6. A turbomachine aerofoil as claimed in claim 1 in which the turbomachine aerofoil is cast from a gamma titanium aluminide.

7. A turbomachine aerofoil as claimed in claim 1 in which the curvatures of the convex surface and the concave surface are arranged to produce a thickness distribution of the aerofoil and a curvature of the concave surface which locates substantially all the surface irregularities in that region of the concave surface where in operation aerodynamic separation, a reverse flow, a slow flow or a stagnant flow occurs.

* * * * *

UNITED STATES PATENT AND TRADEMARK OFFICE
CERTIFICATE OF CORRECTION

PATENT NO. : 5,609,470
DATED : March 11, 1997
INVENTOR(S) : Alec G. DODD

It is certified that error appears in the above-indentified patent and that said Letters Patent is hereby corrected as shown below:

On the title page, item [73], should read:
[73] Assignee: Rolls-Royce plc, London, England Signed and Sealed this Second Day of September, 1997

*Attest:*

BRUCE LEHMAN

*Attesting Officer*   *Commissioner of Patents and Trademarks*